United States Patent [19]

Mattingly et al.

[11] Patent Number: 4,893,408
[45] Date of Patent: Jan. 16, 1990

[54] ENCLOSED PEELING KNIFE AND PRONG HOLDER

[76] Inventors: Judith B. Mattingly; Edward J. Mattingly, both of 1107 Memory La., 8B, Santa Ana, Calif. 92706

[21] Appl. No.: 297,870
[22] Filed: Jan. 12, 1989
[51] Int. Cl.⁴ ............................................ B26B 11/00
[52] U.S. Cl. .................................... 30/123.5; 30/143; 30/148
[58] Field of Search .......................... 30/143, 147–150, 30/222, 323, 123.5, 123.6, 123.7; 294/5

[56] References Cited

U.S. PATENT DOCUMENTS

| | | | |
|---|---|---|---|
| D. 192,562 | 4/1962 | Williams | 30/143 A X |
| 928,134 | 7/1909 | Konigstein . | |
| 1,814,547 | 7/1931 | Edwards . | |
| 2,109,016 | 2/1938 | Ringer | 30/143 |
| 2,220,169 | 11/1940 | Murdock | 30/305 |
| 2,450,348 | 9/1948 | Krilow | 30/304 |
| 2,777,195 | 1/1957 | Dalianis | 30/155 |
| 3,995,902 | 12/1976 | Sciaino, Jr. | 294/5 |

Primary Examiner—Douglas D. Watts
Attorney, Agent, or Firm—Price, Gess & Ubell

[57] ABSTRACT

A telescoping set comprising a peeler knife and a set of holding prongs both fastened to handles of the same outside diameter having a common axial center line. Recesses in the front face of the peeling knife handle telescopically accommodating the prongs in the prong handle. Recesses in the front face of the prong handle telescopically accommodating the blade of the peeling knife.

When the two handles are joined face-to-face the sharp cutting edges of the peeling knife blade and the points of the prongs are protectively enclosed in the assembly.

8 Claims, 1 Drawing Sheet

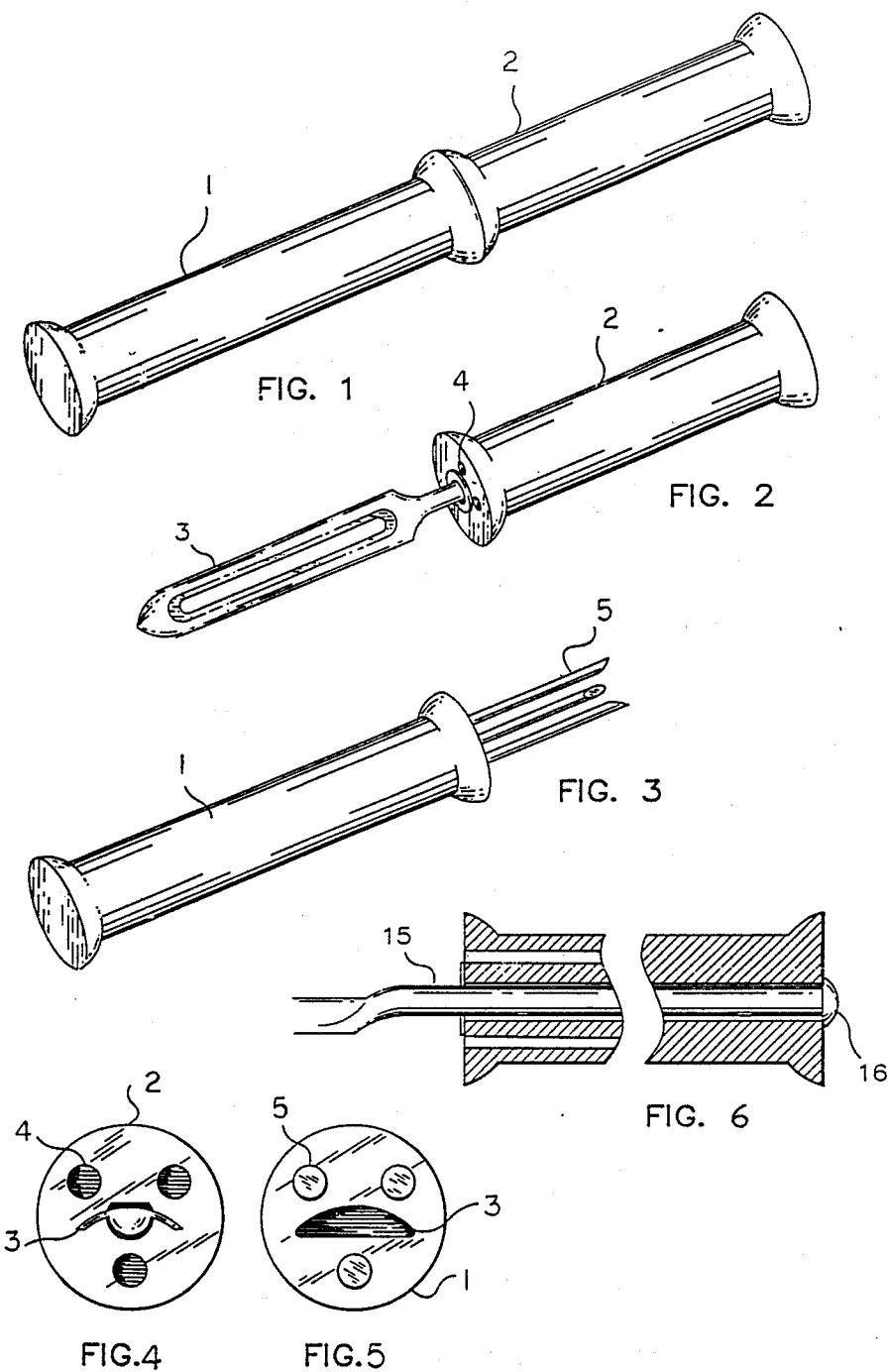

4,893,408

ENCLOSED PEELING KNIFE AND PRONG HOLDER

BACKGROUND OF THE INVENTION

1. Field of the Invention

The present invention relates to a peeling knife and handle which accommodates in recesses of the handle face prongs from an associated prong holder on a separate handle. When telescopically engaged face-to-face the knife blade and prongs are encased wihin the handle assemblies thus protecting the sharp surfaces of the knife and prongs.

2. Description of the Prior Art

The design concept of the present invention was not disclosed in the prior art searched. The U.S. Pat. No. 3,996,902 Sciamo, Jr., appears to be pertinent in the disclosure of a corn holder in two parts each having tangs which are accommodated in handle recesses for storage. The functions and uses of the Sciamo Jr., patent do not serve the purposes and uses of the present invention.

SUMMARY OF THE INVENTION

Many kitchen utensils used for holding and peeling vegetables contain sharp edged surfaces or prongs with sharp points which provide a dangerous environment when the utensils are stored or not in use.

The present invention provides a two piece set comprising a peeling knife and a prong holder with recesses in the facing ends of the handles for accommodating the knife and prongs. The associated handles, cylindrical in cross section, when assembled or interlocked face-to-face allows the knife blade of one portion to fit into a recess in the handle face of the second portion while the prongs of the second portion fit into recesses in the first portion providing a single cylindrical package wherein the sharp cutting surfaces are totally enclosed within the handles.

BRIEF DESCRIPTION OF THE DRAWINGS

FIG. 1 is a top front perspective view of the peeling knife and prong assembly;

FIG. 2 is a top front perspective view of the peeling knife and handle;

FIG. 3 is a top front perspective view of the prongs and handle;

FIG. 4 is an end view of the peeling knife assembly;

FIG. 5 is an end view of the prongs assembly; and

FIG. 6 is a partial sectional view of peeling knife and handle.

DETAILED DESCRIPTION OF THE PREFERRED EMBODIMENT

Referring to FIG. 1 the peeling knife portion 2 and the prongs portion 1 are shown joined axially at their front faces. FIG. 2 shows the peeling knife 3 attached to the handle 2 with recesses 4 for internally accommodating the prongs 5. FIG. 3 shows the prongs 5 attached to the face of the handle 1. FIG. 4 is an end view of the face of the peeling knife handle 2 showing the recesses 4 for the prongs 5. FIG. 5 is an end view of the face of the prongs handle 1 showing the prongs 5 and the recess 3 for the peeling knife blade. FIG. 6 is partial sectional view of the peeling knife 15 and handle showing one possible embodiment wherein the peeling knife 15 is mounted in the handle with screw 16. FIG. 6 further serves to illustrate the concentric relationship between the peeling knife 15 and the recesses 4 that accommodate the prongs 5 when the peeling knife handle 2 and the prong handle 1 are interlocked.

In the assembled or interlocked arrangement as shown in FIG. 1 the peeling knife blade and the prongs are fully contained in the assembly thus providing protection from the sharp cutting surfaces.

We claim:

1. An improved telescoping assembly of a peeling knife and a set of holding prongs wherein the improvement comprises:
    a peeling knife blade attached to a peeling knife handle of circular cross section;
    a plurality of prongs attached to a prong handle of circular cross section;
    the handle of the peeling knife having recesses in its face for telescopically accommodating the prongs attached to the prong handle, the recesses being distant from the peeling knife;
    the handle for the prongs having a recess in its face for telescopically accommodating the peeling knife attached to the peeling knife handle, the recess being distant from the prongs;
    the peeling knife handle being on a common axial center line with the prong handle; and
    the peeling knife handle being of the same outside diameter as the prong handle.

2. The improved assembly of claim 1 wherein the number of prongs is three.

3. The improved assemble of claim 2 wherein the three prongs and the recesses in the peeling knife handle form a triangular pattern that surround the peeling knife.

4. An interlocking peeling knife and holding prong device comprising:
    a first elongated handle having a first front face and further having a peeling knife extending axially outwardly from said first front face;
    a second elongated handle having a second front face and further having a plurality of prongs extending axially outwardly from said second front face;
    said first handle having a plurality of recesses in said first front face that are distant from said peeling knife for accommodating said plurality of prongs and said second handle having a recess on said second front face that is distant from said prongs for accommodating said peeling knife, whereby said prongs and said peeling knife may be interlocked and protectively recessed in said handles when not in use.

5. The interlocking peeling knife and holding prong device of claim 4 wherein each of said handles has a circular cross section.

6. The interlocking peeling knife and holding prong device of claim 4 wherein the number of prongs and corresponding recesses in said first handle is three, said prongs and said recesses forming a triangular pattern.

7. The interlocking peeling knife and holding prong device of claim 6 wherein the triangular pattern formed by said three prongs and said three recesses in the first handle surround said peeling knife when said peeling knife and said prongs are interlocked.

8. An interlocking peeling knife and holding prong device comprising:
    a first elongated handle of circular cross section having a first front face and further having a peeling knife extending axially outward from the center of said first front face;

a second elongated handle of circular cross section having a second front face and further having a plurality of prongs extending axially outward from said second front face and at a minimum radial distance from the center of said second front face such that said prongs do not interfere with said peeling knife;

said first handle having a plurality of recesses in said first front face for internally accommodating said plurality of prongs and said second handle having a recess at the center of said second front face for internally accommodating said peeling knife, whereby said prongs and said peeling knife may be interlocked and protectively recessed in said handles when not in use.

* * * * *